United States Patent [19]

Gorski et al.

[11] 4,334,361

[45] Jun. 15, 1982

[54] PASTA GAUGE

[76] Inventors: Carol A. Gorski; Saul B. Gorski, both of 123 S. Blanchard St., Wheaton, Ill. 60187

[21] Appl. No.: 32,509

[22] Filed: Apr. 23, 1979

[51] Int. Cl.³ .............................................. G01B 5/00
[52] U.S. Cl. .................................. 33/174 T; 33/1 V; 73/426; 229/7 SC
[58] Field of Search ................. 33/1 V, 1 F, 174 R, 33/174 T, 174 H, 121; 73/426, 429; 229/7 R, 7 SC, 11, 17 M, 17 SC; 426/394

[56] References Cited

U.S. PATENT DOCUMENTS

| | | | |
|---|---|---|---|
| 2,674,888 | 4/1954 | Simonet | 33/121 |
| 3,110,436 | 11/1963 | Wagner | 229/7 SC |
| 3,874,085 | 4/1975 | Atkins | 33/174 T |
| 4,120,094 | 10/1978 | Pfaelzer | 33/174 T |
| 4,165,565 | 8/1979 | Cloutier et al. | 33/174 T |

FOREIGN PATENT DOCUMENTS 383838  11/1932  United Kingdom ................. 73/429

*Primary Examiner*—Richard R. Stearns

[57] ABSTRACT

A pasta gauge for mechanically selecting specific quantities of elongated dried pasta, such as spaghetti, the gauge comprising a container to be filled with said pasta, said container having an endpiece capable of being adjusted so as to form in one end of the gauge an aperture of a predetermined area or of one of a plurality of predetermined areas, said aperture representing a specific quantity of said pasta, which quantity is selected from a larger bundle of dried pasta members within the gauge by tilting said gauge so that said specific quantity of pasta members slides through the aperture while the remaining pasta noodles are supported by the area surrounding the aperture and remain within the gauge, said specific quantity of pasta members thus being separated from the remainder of the bundle.

2 Claims, 6 Drawing Figures

PASTA GAUGE

BACKGROUND OF THE INVENTION

Because of the shape and rigidity of dried, elongated pasta noodles, such as uncooked spaghetti, it is difficult to determine the correct amount of such noodles necessary to produce a desired number of serving portions. The problem of judging portions is compounded by the fact that pasta expands in cooking. Obviously, dried pasta noodles cannot be gauged by an ordinary measuring cup because they will not fit compactly in such a cup. Package guides illustrating bundle diameters are helpful but not entirely satisfactory. Devices for measuring pasta by thrusting it through a fixed aperture in a flat surface have seldom reached the marketplace, probably because using such a device requires manual dexterity and may often result in breakage or spillage of the brittle dried pasta. If a user is unable to measure dried pasta accurately and prepares too much, waste results; preparing too little leads to inconvenience and delay as additional pasta is prepared.

The instant device, on the other hand, provides a simple, accurate, and sanitary means for measuring elongated dried pasta. Such pasta placed in this gauge may easily be measured with little handling or danger of spillage, simply by forming an aperture in the end of said gauge and tilting said gauge so that a predetermined amount of pasta falls through said aperture directly into a cooking pot.

Unlike other devices that can conveniently measure only one, two, or three serving portions of pasta, certain embodiments of the instant device can measure pasta of any of the lengths commonly manufactured commercially, whereas other devices can measure only one length of pasta.

Unlike other measuring devices for pasta, the instant device also serves as a sanitary storage container for pasta, to prevent spillage and waste and to protect from dirt and the vermin that infest cereal products. Such a container is desirable for all pasta, and particularly so for pasta marketed in fragile cellophane bags or for the increasing quantity of pasta made at home by hand or with simple machines. The instant device, therefore, in addition to preventing waste and inconvenience, promotes sanitation and order.

SUMMARY OF THE INVENTION

In the present invention, a container for pasta is provided, said container having an endpiece that is adjustable to form in the end of the box an aperture of a predetermined area or of any of a plurality of predetermined areas. When an aperture is formed and the container is tilted, a part of the bundle of pasta members within the container falls through the aperture by force of gravity; the remainder of the bundle, being supported by the area surrounding the aperture, remains inside the container. The amount of pasta that exits through the aperture depends on the area of said aperture; therefore the present invention functions as a gauge for measuring pasta.

The device may be made of durable materials, or it may be intended as a disposable container, in which pasta may be marketed.

The adjustable endpiece may be of one of three general kinds: (1) It may slide in a track or other guide and may be closed, so that the gauge is sealed, or placed in various specific open positions, thus creating an aperture of any of several predetermined areas. (2) It may be removed from the gauge to form an aperture; such removable endpiece may comprise one part that, when removed, forms an aperture of predetermined area, or may comprise a plurality of parts that may be removed from the gauge separately, so as to form an aperture of any of a plurality of predetermined areas, depending on how many parts are removed. Examples of this embodiment are removable and replaceable plugs, and punch-out sections attached to the gauge by frangible means. (3) The adjustable endpiece may be an integral part of the container and may be opened to a predetermined position or to any of several predetermined positions to form a specific aperture area or any of several specific aperture areas, by bending the endpiece at a predetermined place; such endpiece may be reclosable so as to prevent the unintentional spillage of pasta.

Pasta is manufactured in various lengths; in the United States, most commercially manufactured pasta is either seven, ten, or fourteen inches long. A gauge may be designed so as to be capable of measuring any of several specific lengths of pasta. Such a gauge may have on its side, top, or bottom a calibration for determining the length of pasta within the gauge. Such gauge may also have a plurality of calibrations adjacent to the endpiece, each said calibration to be used in measuring one predetermined length of pasta. For example, if ten-inch pasta is in the gauge, and a person wishes to measure out two serving portions of said pasta, he or she may open the endpiece to the "2" mark on the "10-inch pasta" calibration. The amount of pasta that falls through the resulting aperture is two serving portions of the ten-inch pasta.

On the other hand, a disposable pasta gauge may be marketed containing pasta; in that case it will probably be used to measure only the length of pasta it contains. Therefore it will probably require only one calibration adjacent to the endpiece and will need no calibration for determining the length of the pasta within the gauge.

When the gauge is used in measuring a very small quantity of pasta—for example, one serving portion—friction between the pasta and the edges of the aperture may hamper the free egress of the pasta. For this reason, the interior configuration of the gauge may be designed so as to decrease the perimeter of the aperture, thus reducing friction between the pasta and the edges of the aperture and facilitating the egress of said small quantity of pasta. This may be accomplished, for example, by forming the interior bottom of the gauge in a semicircular, troughlike, or other concave configuration.

DETAILED DESCRIPTION OF THE PREFERRED EMBODIMENTS

Figure 1:
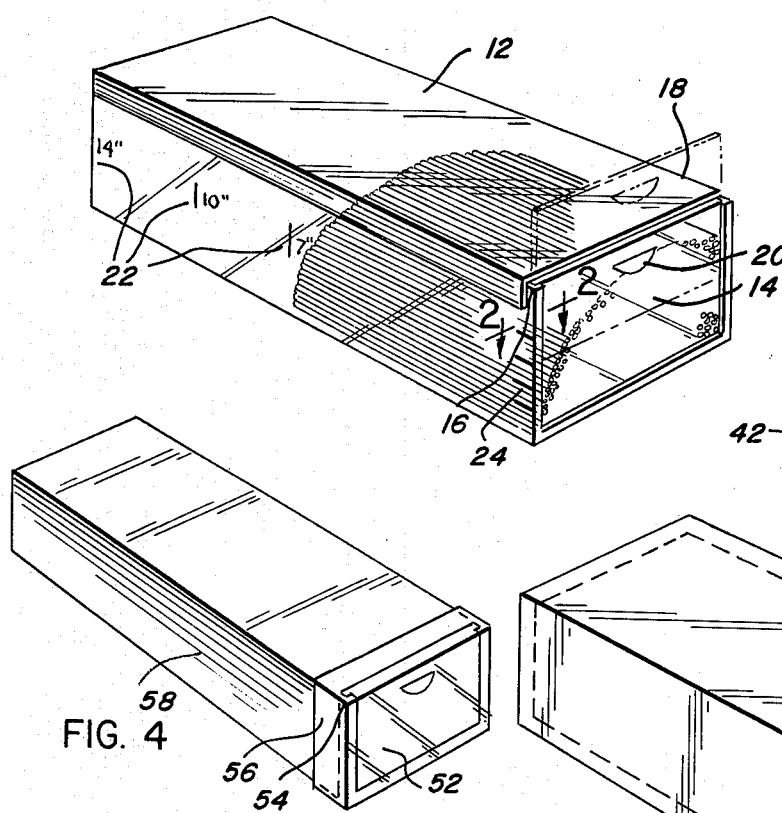
FIG. 1 is a perspective view of a preferred embodiment of instant pasta gauge, having an adjustable endpiece that slides in a track, a calibration for measuring the length of pasta within the gauge, and a calibration for use in positioning the endpiece.

Referring to the drawing, several embodiments are illustrated that disclose several variations in the form of the pasta gauge.

FIG. 1 shows a gauge that may be used to measure pasta that is either seven, ten, or fourteen inches long. The gauge may have a lid (12) to facilitate inserting pasta in the gauge and for ease of cleaning. The endpiece (14) slides up and down in a track (16). The phantom view (18) shows the endpiece in open position. The endpiece may have a molded-in depression (20) that serves as a thumbgrip. On the side of the gauge is a calibration (22) with which to determine whether the gauge contains seven-inch, ten-inch, or fourteen-inch pasta. Adjacent to the endpiece is another calibration (24) to be used as a guide in positioning the endpiece so as to measure out a desired quantity of pasta. In this embodiment, the bottom of the gauge (38) is flat.

Figure 2:
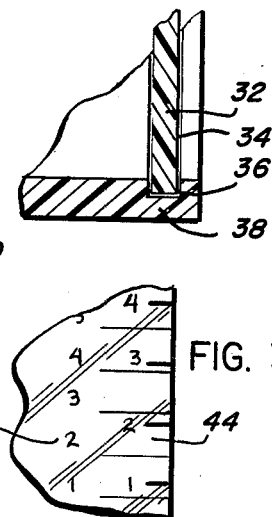
FIG. 2 is a cross-sectional view of the adjustable endpiece of FIG. 1 and the track within which it slides.

FIG. 2 is a cross-sectional view of the sliding endpiece of FIG. 1. The endpiece (32) slides in a track (34) and fits into a groove (36) in the bottom of the gauge (38).

Figure 3:
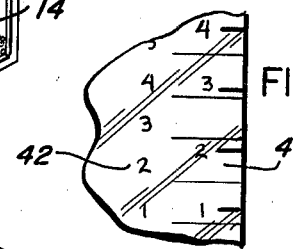
FIG. 3 is a fragmentary view of the calibration for use in positioning the endpiece as shown in FIG. 1.

FIG. 3 is a fragmentary view of two calibrations adjacent to the sliding endpiece of FIG. 1. The calibration on the left (42), for example, could be used in measuring out various serving portions of pasta that is ten inches long; the calibration on the right (44) could be used in measuring out various serving portions of seven-inch pasta.

Figure 4:
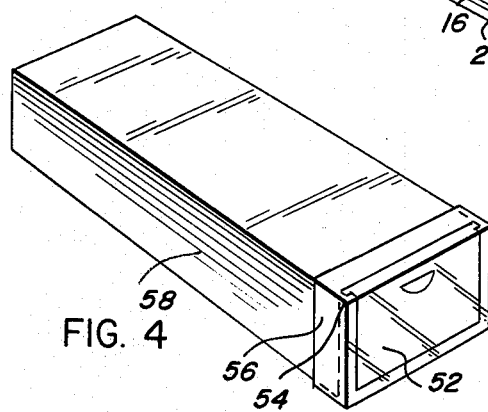
FIG. 4 is a perspective view of a pasta gauge having an adjustable endpiece that slides in a track; in this embodiment the adjustable endpiece and its track may be made of a rigid material such as plastic; the rest of the gauge may be made of cardboard or some other inexpensive material.

FIG. 4 is a semidisposable embodiment that may be marketed filled with uncooked pasta noodles. It has an endpiece (52) sliding in a track (54). The endpiece and the track and its framwork (56) may be made of rigid plastic or some other rigid material. However, the rest of the gauge (58) may be made of cardboard or some other material different from that of the endpiece and its track and framework.

Figure 5:
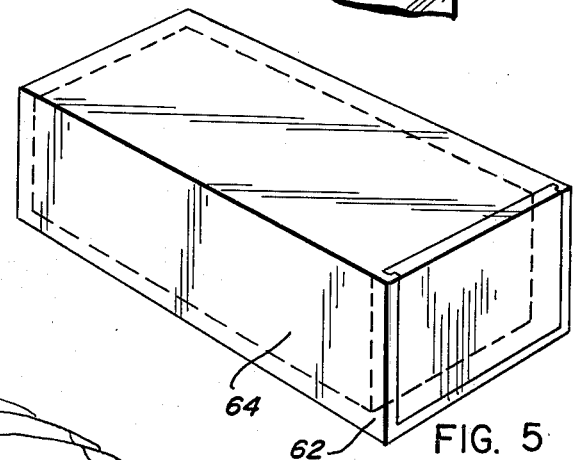
FIG. 5 is a perspective view of the instant pasta gauge containing an ordinary commercial package of pasta (in phantom)

FIG. 5 shows a pasta gauge (62) with an ordinary package of commercial pasta (64) inside it. The pasta gauge may be made of transparent plastic to allow a view of the commercial package of pasta (shown here in phantom).

Figure 6:
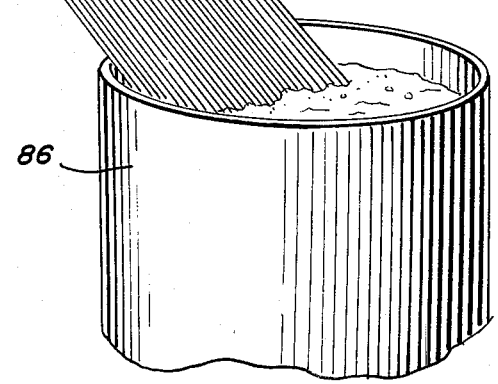
FIG. 6 is an illustration of part of the method of using the gauge.

FIG. 6 shows part of the method of using the pasta gauge. The sliding endpiece (82) has been raised to the desired position. The gauge (84) is tilted over a cooking pot (86) and the desired quantity of uncooked pasta noodles falls directly into the pot.

Although several embodiments of the invention have been described herein, many variations thereof can be made by those skilled in the art without departing from the spirit of the invention. Therefore, it is intended that the scope of the invention be limited only by the claims that follow.

We claim:

1. A pasta gauge for selecting a predetermined quantity of a plurality of elongated, dried pasta members from a larger bundle of elongated, dried pasta members, comprising:

a transparent, box-like container into which said larger bundle of pasta is placed;

said container being open at one end and closed at the other end;

said container comprising a plurality of quantity-indicating graduations provided on one or both side walls in proximity to said open end, each said graduation pertaining to the measurement of pasta of a predetermined length;

said container including in its open end a slidably mounted planar member, the bottom edge of which may be aligned with any of said quantity-indicating graduations so as to create in said open end of said container an aperture of predetermined area or of one of a plurality of predetermined areas, each said area representing, when filled with a bundle of elongated, dried pasta members, a specific quantity of such pasta members;

the part of the gauge end that surrounds the aperture forming an area for supporting the balance of the larger bundle of pasta members apart from the desired quantity of pasta members which slide by gravity through said aperture into a cooking pot or another location selected by the user, whereby the pasta members that slide from said gauge may be separated from the pasta members supported by said gauge end surrounding the aperture; and wherein said gauge includes one or more graduations to enable the user to determine the length of the elongated dried pasta members within said gauge;

said slidable planar member being closeable such that the entire gauge forms a storage container for elongated dried pasta members before their use.

2. A pasta gauge and container for selecting a predetermined portion of a plurality of elongated, dried pasta members from a larger bundle of elongated, dried pasta members of substantially equal length comprising an elongated container which is rectangular in cross-section and has planar bottom, top and side walls for holding said larger bundle of pasta members, said container being open at one end and closed at the other end, a plurality of portion indicating graduations provided on one of said side walls in proximity to said one end, a plurality of length indicating graduations provided on one of said walls to show the length of the pasta members disposed in said container, at least said one of said walls being transparent in the vicinity of said length indicating graduations, a planar closure member slidably mounted over said one end to enable the selective positioning of said closure member at a plurality of predetermined portion selecting positions corresponding to predetermined open areas at said one-end uncovered by said closure member, the distance between said ends being greater than the respective lengths of said pasta members, and the diagonal distance across said container being substantially less than said respective lengths of said pasta members to hold said pasta members in substantially mutually parallel relationship in said container.

* * * * *